United States Patent [19]

Majette et al.

[11] Patent Number: 4,786,803

[45] Date of Patent: Nov. 22, 1988

[54] SINGLE CHANNEL ENCODER WITH SPECIFIC SCALE SUPPORT STRUCTURE

[75] Inventors: Mark W. Majette; Hatem E. Mostafa; Chuong C. Ta, all of San Diego, Calif.

[73] Assignee: Hewlett-Packard Company, Palo Alto, Calif.

[21] Appl. No.: 56,936

[22] Filed: Jun. 1, 1987

[51] Int. Cl.$^4$ .............................................. G01B 11/14
[52] U.S. Cl. ................... 250/237 G; 250/239; 356/375; 341/13
[58] Field of Search ............... 250/221, 231 R, 237 R, 250/237 G, 239, 231 SE; 356/396, 374, 375; 340/347 P; 33/125 C; 324/175

[56] References Cited

U.S. PATENT DOCUMENTS

| | | | |
|---|---|---|---|
| 4,359,636 | 11/1982 | Stauffer | 250/237 R |
| 4,387,300 | 6/1983 | Dudash et al. | 250/237 G |
| 4,477,726 | 10/1984 | Reichl | 250/237 G |
| 4,564,294 | 1/1986 | Ernst | 250/237 G |
| 4,587,418 | 5/1986 | Shirakoshi et al. | 250/239 |
| 4,704,524 | 11/1987 | Masaki et al. | 250/239 |

*Primary Examiner*—Edward P. Westin
*Assistant Examiner*—Charles Wieland

[57] ABSTRACT

The single channel encoder comprises a transparent scale in which the scale divisions are defined by transverse opaque lines having a width greater than the width between the opaque lines. An emitter holder and a detector holder snap together, clamping an aperture plate there between. The aperture plate has a slit therein which is disposed in the optical path between the emitter and the detector. Projections functioning as scale supports on the opposite sides of the emitter holder and the detector holder are disposed in longitudinally spaced positions and define a gap therebetween for engaging the outside edges of the encoder scale outside of the opaque transverse lines to precisely position the scale in the optical path for maintaining a constant gap between the encoder scale and the aperture plate.

8 Claims, 8 Drawing Sheets

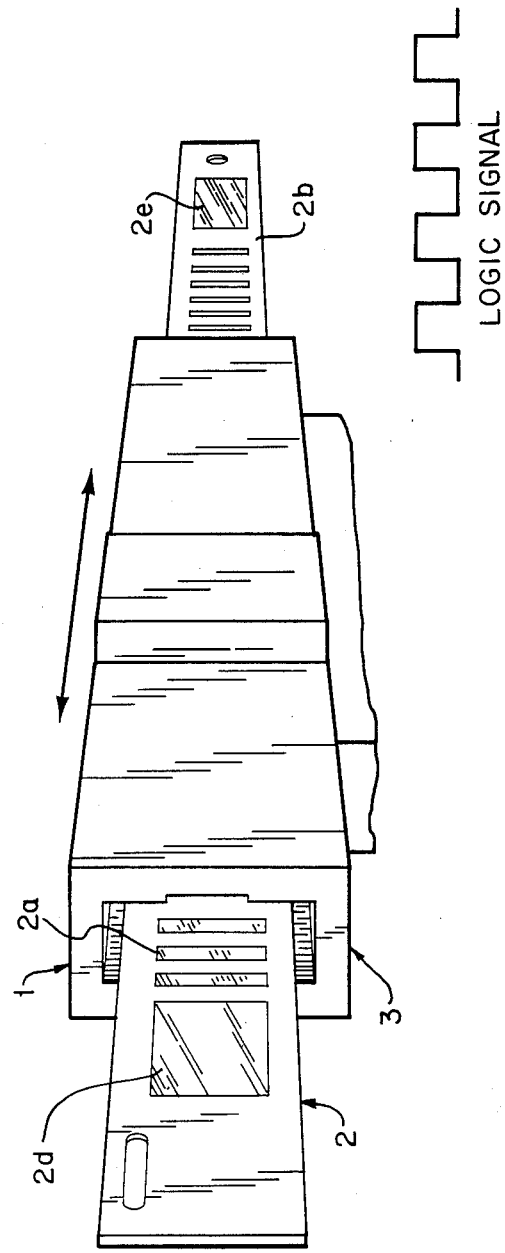
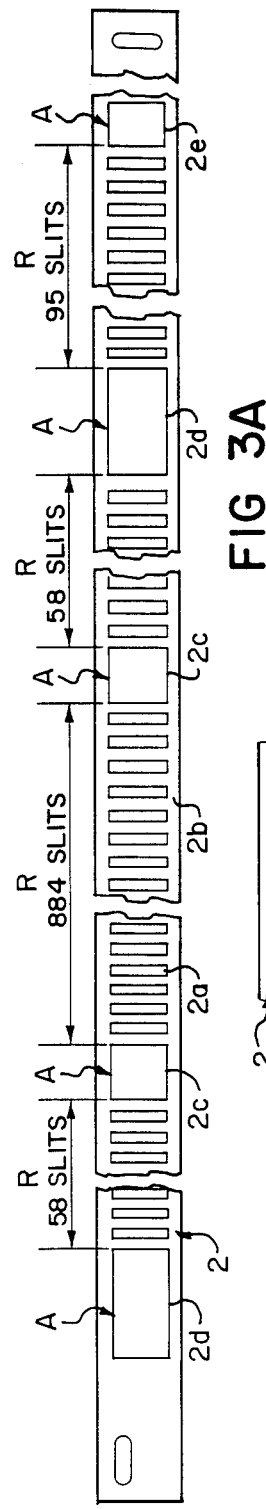
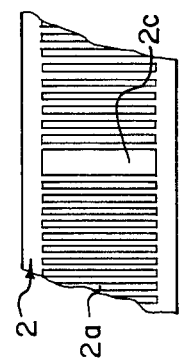
FIG 1
FIG 3A
FIG 3B

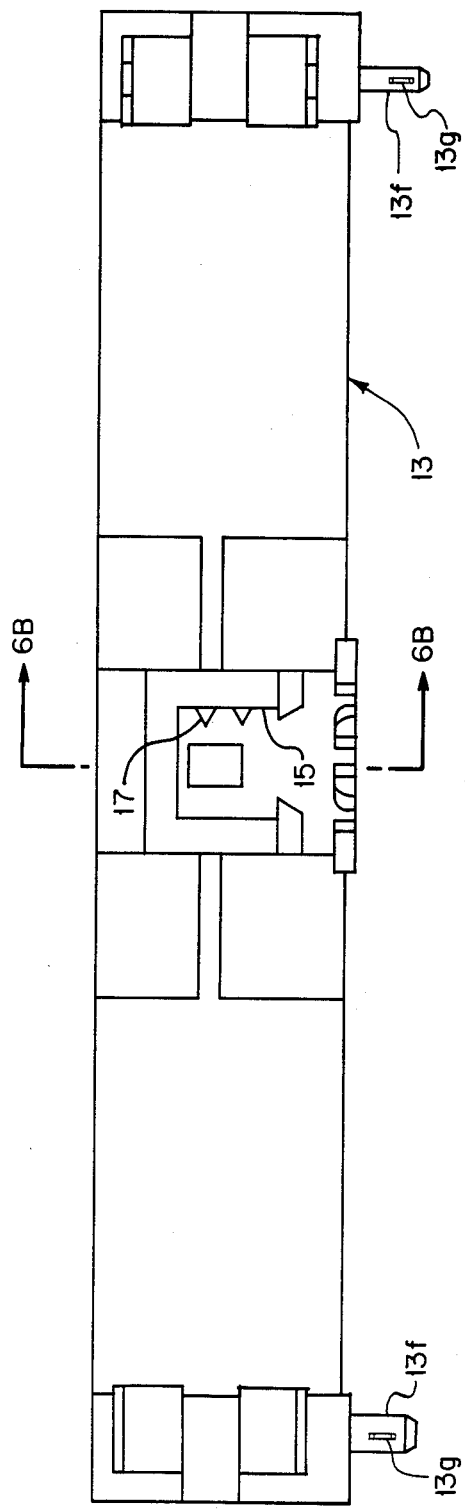
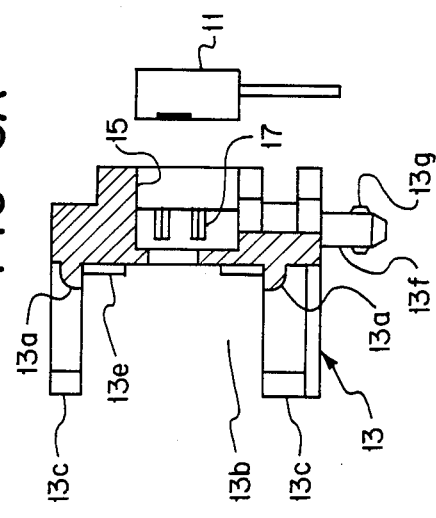
FIG 6A
FIG 6B

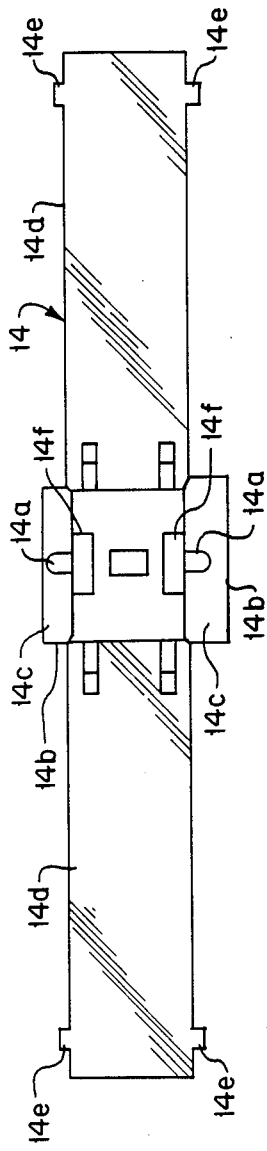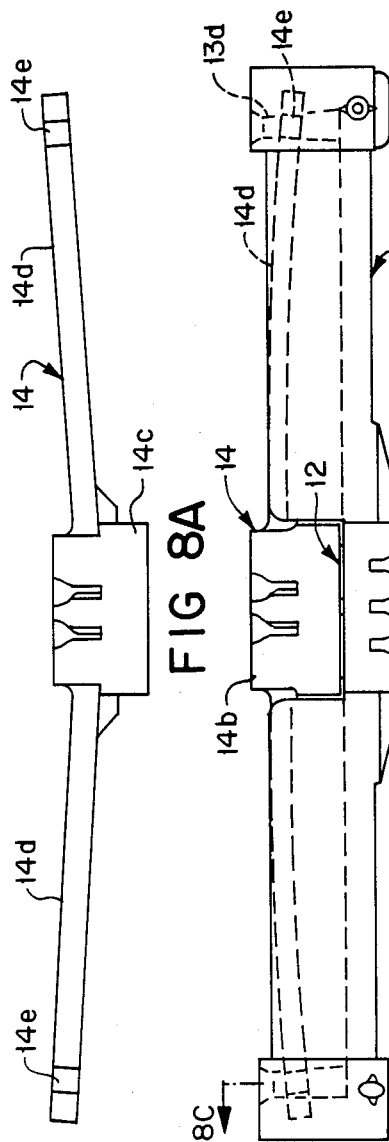
FIG 7
FIG 8A
FIG 8B
FIG 8C

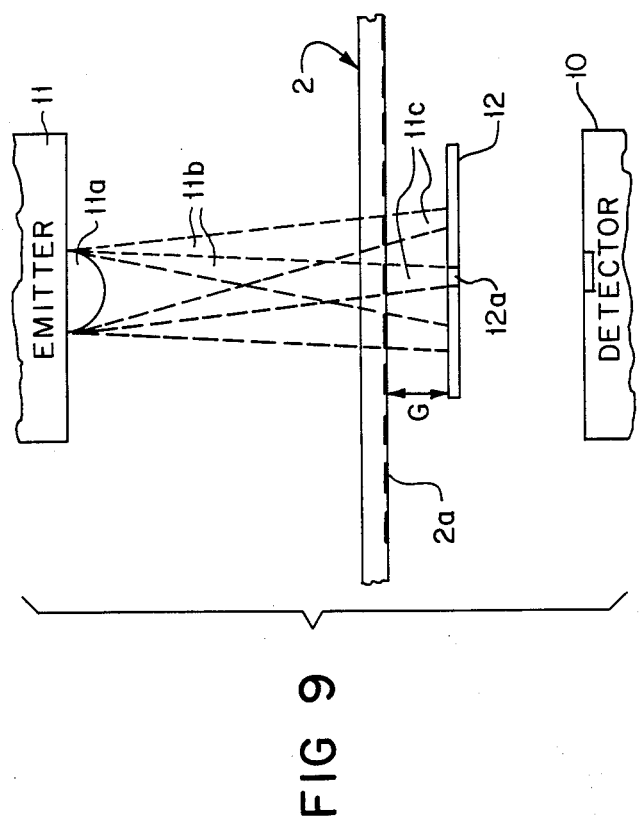
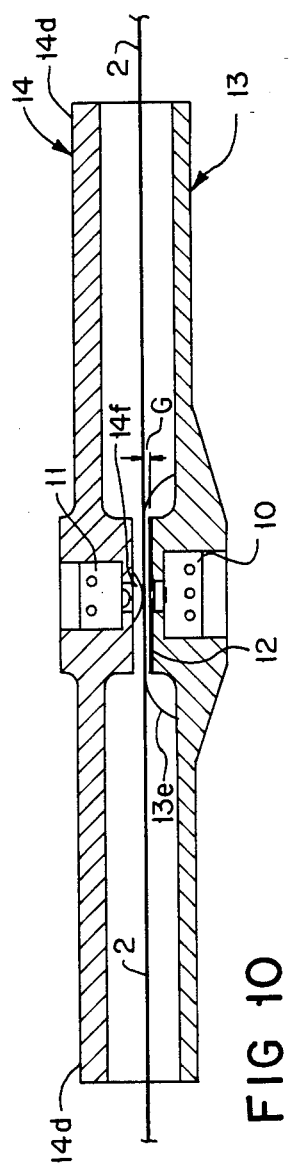
FIG 9
FIG 10

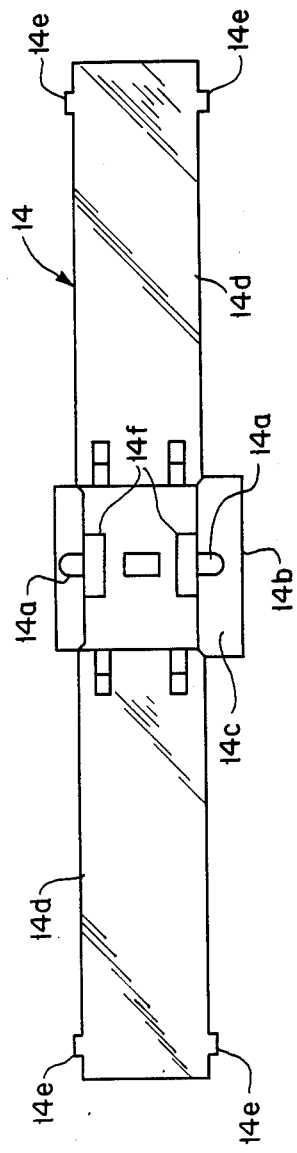
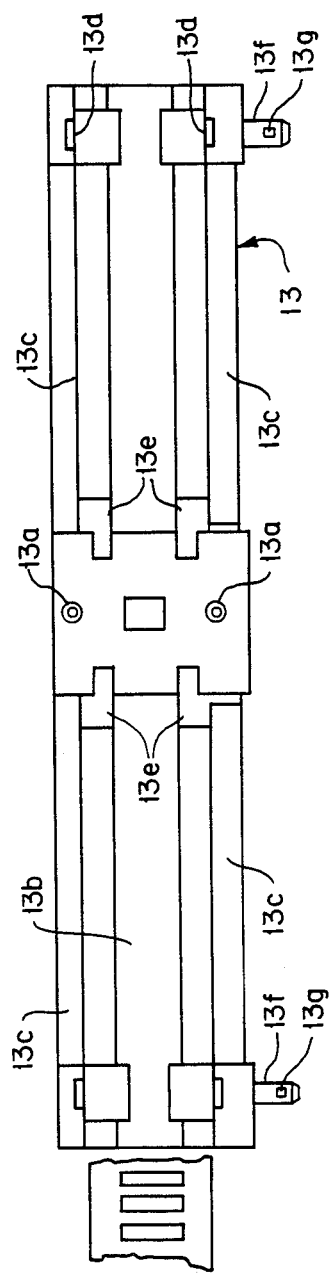
FIG 11A
FIG 11B

SINGLE CHANNEL ENCODER WITH SPECIFIC SCALE SUPPORT STRUCTURE

TECHNICAL FIELD

This invention relates generally to encoders for detecting increments of position of a member moveable in an axis of freedom and more particularly to a single channel encoder for such and application.

BACKGROUND ART

Incremental position transducers or encoders are of two general types. These are linear and rotary. The rotary type of encoder, as seen in U.S. Pat. No. 3,262,105, does not measure or sense increments of position directly along an axis. It has a rotatable circular scale which is driven by a screw, or the motor which drives the screw, which, for example drives a carriage in an axis. The encoder then senses increments of angular displacement of the scale measured on the periphery of the scale rotor as well as revolutions of the scale. The linear type of encoder, as seen in U.S. Pat. Nos. 2,848,698 and 3,245,144, senses increments of position along the axis of freedom as well as the limits of movement. A linear scale is provided and the encoder resolves scale divisions in the axis upon the occurrence of relative movement between the encoder body and the scale.

Optical or magnetic encoders have been employed. The general principles are the same for both magnetic and optical techniques. Magnetic incremental transducers were employed in a machine tool application in U.S. Pat. No. 3,245,244, above.

The use of dual channels for resolving a single scale as practiced in such prior art arrangements provided a sense of the direction of displacement as well as providing a scale count or scale resolution that was finer than the actual dimensions of the physical scale divisions. Two transducer heads in side-by-side relationship displaced one-quarter of a scale division apart along the scale provided a pair of time varying quadrature phase signals which when processed provide information as to the direction of movement as well as scale resolution equivalent to one-quarter of a physical division of the actual scale.

Such arrangements require equipment and logical processing capabilities which are expensive and complex. Complexity adds to maintenance costs to insure reliability. In less expensive systems such as small letter size printers where such precise scale resolution is not required the expense associated with such system sophistication, both as to initial cost and maintenance may not be justified. System simplification and parts reduction can be expected to improve reliability while reducing initial costs.

DISCLOSURE OF THE INVENTION

Simplification with respect to such prior art systems is achieved in the provision of a single channel encoder. The invention in its presently preferred form is an optical encoder, although the principles are applicable to magnetic encoders as well. The invention is applied to a printer although its principles are useful in plotters and machine tools for example.

The single channel encoder comprises two principal parts, the encoder scale and the scale encoder or transducer which reads the scale. In the application to a printer, the scale is fixed to the printer chassis parallel- ing the axis in which the print head carriage moves. The scale encoder is fixed to the print head carriage in a position to traverse and to read the scale. Optical coupling is employed using a light source as the emitter such as a galium aluminum arsinide GaAlAs, light emitting diode which emits infrared light energy (Type KE3038 by Optek), and an infrared detector (Type ULN3330T by Sprague Electric Company). These are disposed in the encoder on opposite sides of the scale. The scale is a strip of transparent plastic. Opaque transverse lines, photographically produced and equally spaced, define the scale divisions. Upon relative movement between the scale and the encoder, the light energy impinging upon the detector is interrupted by the opaque lines providing a time varying output signal which is ideally processed as a square wave signal, in which corresponding time displaced points represent a scale division. The processing of this signal provides a scale count for position information and the scale count per unit of time provides rate information.

The scale is flexible and has wider opaque lines than the transparent spaces there between. The scale passes through the encoder unit and is precisely positioned or spaced with respect to a slit or an aperture in an aperture plate in the light path between the emitter and the detector. In this position the light impinging upon the detector is precisely controlled to obviate errors in sensing scale divisions.

The encoder is simple in construction comprising two body parts into which the emitter and detector are interference fitted, respectively. The two body parts snap together with the aperture plate precisely located there between and when assembled define a passage having a gap for precisely spacing the encoder scale passing therethrough with respect to the aperture plate.

The advantages of the single channel encoder are three-fold. They are, low cost, high reliability, and ease of assembly.

Low cost is obtained by both the low number of parts and by the adequacy of lower performance, lower cost optical electronic parts. The low parts count results from the use of only one detector as opposed to two in a quadrature type encoder such as discussed above. The design of the encoder unit also contributes to low cost by avoiding the need for fasteners or bonding cements or other agents for assembly purposes. Finally assymmetry of the scale pattern in the form of wider dark lines than the transparent spaces therebetween plus control of the space or gap between the aperture plate and the scale provides a good functional margin in critical parts such as the emitter and the detector. This allows the use of lower performance less expensive optoelectronic parts.

Reliability of the encoder is improved by the low parts count and by the encoder design. With one detector instead of two the probability of a detector failure is lower. Precise dimensional control of the scale-aperture plate gap makes the encoder insensitive to vibration of the scale, allowing accurate measurement in most operating environments such as a printer.

Design features in the encoder, as briefly described above contribute to ease of assembly. The use of press-fits, snap-fits, and bending stiffness in parts of the emitter holder which lock into the detector holder avoid the need for special fasteners or bonding agents. Additionally mounting pins are provided which facilitate attachment of the encoder to a circuit board interface which permits automatic insertion.

BRIEF DESCRIPTION OF THE DRAWINGS

Other advantages and improvements will become apparent from a study of the following specification when considered in conjunction with the accompanying drawings in which:

FIG. 1 is a perspective view of the single channel encoder of this invention;

FIG. 3a fragmentarily illustrates the layout of this single channel encoder scale. The drawing is not to scale;

FIG. 3b is an enlarged detail of the encoder scale at location 2c drawn approximately to scale;

FIG. 6a is a top plan view of the detector holder of the encoder body of the single channel encoder;

FIG. 6b is a cross-sectional view of the detector holder taken on the line VIb—VIb of FIG. 6a, with the detector in position for insertion into the cavity in the detector holder;

FIG. 7 is a bottom plan view of the emitter holder;

FIG. 8a is an elevational view of the emitter holder showing its upwardly swept arms;

FIG. 8b illustrates the assembly of the emitter holder with the detector holder to form the encoder unit;

FIG. 8c is a cross-sectional view taken on the line VIIIc—VIIIc of FIG. 8b.

FIG. 9 schematically illustrates the optical arrangement of the single channel encoder;

FIG. 10 is an enlarged longitudinal cross-sectional detail of the aperture plate gap structure of the single channel encoder;

FIG. 11a is a bottom plan view of the emitter holder detailing the location of the curved projections which function as scale guides in limiting the upward movement of the scale; and FIG. 11b is a top plan view of the detector holder detailing the location of the curved projections which function as scale guides in limiting downward movement of the scale.

BEST MODE FOR CARRYING OUT THE INVENTION

FIG. 1 is a perspective view of the single channel optical encoder according to this invention. The encoder 1 comprises two major components which are the encoder strip or scale 2 and the encoder unit 3 which reads the scale. As shown in FIG. 1 the scale 2 has a pattern of closely spaced opaque lines 2a, defining the scale. These are overlaid on a clear base material. The scale 2 passes through the encoder unit 3 which reads the scale divisions and converts or encodes the scale pattern into an electric logic signal idealized as a square wave signal in FIG. 1. Digital electronics (not shown) utilize this logic signal to determine the rate of relative motion between the scale 2 and the encoder unit 3 and the encoder position along the scale 2. Only one such logic signal is produced (as opposed to the quadrature signals in the case of the quadrature encoder discussed above) which is why the encoder is labeled single channel. The logic signal provides information useful in determining carriage position and rate of movement in the carriage area.

Figure 2:
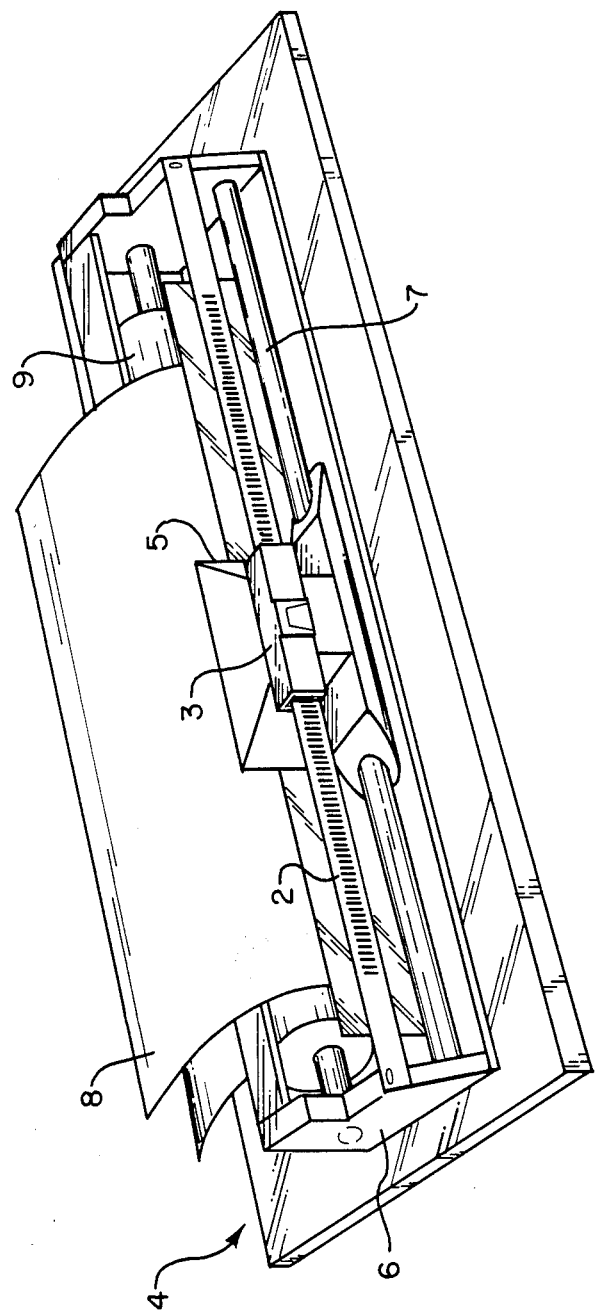
FIG. 2 is a perspective view of an ink jet printer illustrating the mounting of the single channel encoder.

The encoder and scale are designed for use in a printer such as an ink jet printer. Other applications would include plotters and generally any application where the rate of movement and position in an axis are to be measured. A printer 4 as seen in FIG. 2 has a pen carriage 5 and a printer chassis 6. The pen carriage 5 carries printheads such as ink jet pens or other marking or machine devices (not shown). It is mounted on a carriage track 7 and sweeps with the carriage across the printing medium or paper 8 which in turn is advanced by a platen 9 on the printer chassis 6 in a direction orthogonal to the carriage axis. The scale 2 is mounted at its ends on the printer chassis 6. The encoder unit 3 rides on the carriage track 7 on the printer chassis 6. Movement of the pen carriage 5 relative to the printer chassis 6 causes a corresponding movement of the encoder unit 3 with respect to the encoder scale 2, thereby providing a logic signal for use in the measurement of the change in pen carriage position with respect to the printer chassis as well as the rate of movement. Since the encoder unit 3 is on the pen carriage 5 it provides a direct measurement of position in the carriage axis as opposed to shaft encoders which measure rotation of the motor or drive screw driving the carriage.

In this application, the logic signals, such as seen in FIG. 1, provided by the encoder unit 3 are used in two ways. The first way is the use of the logic signals to control the pen carriage speed which must be held to within a desired tolerance of a constant printing speed. When so used the encoder unit 3 conventionally serves as a feedback transducer in a closed loop control system. The second way is the use of the logic signals to control timing of the firing of ink dots from the pens which must occur at precise increments across the print medium. The encoder also provides this information to the printer system. The printer control system is not shown since it forms no part of this invention.

The single channel encoder 1 as seen in FIG. 1 comprises the encoder scale 2 and the encoder unit 3. The encoder scale 2 is a single part fabricated of a single transparent strip, while the encoder unit 3 contains 5 parts. The encoder scale 2 is shown in FIG. 3. It is composed of a strip of photographic film 2b which is a clear polyester base material coated with a photo sensitive emulsion. This permits photographic production of the pattern of closely spaced opaque lines 2a defining the scale which is very percise and also inexpensive. The pattern of opaque lines 2a which serves to interrupt the transmission of light between a light source and a detector consists primarily of closely spaced narrow bands or lines 2a defining a scale. Also present are wider bands 2c, 2d, and 2e which signal various logical positions of the carrier such as end of print, end of sweep (for stopping and reversing) and parking, respectively. A key design feature is the relatively width of the dark narrow bands or lines and their neighboring narrower transparent bands which define the scale divisions. The dark narrow bands in one printing application are nominally 0.180 mm wide whereas the transparent bands are 0.102 mm wide (0.180 mm+0.102 mm=0.282 mm=1/90 inch). This additional width in the dark bands provides an additional functional margin which will be described in more detail at a later point with respect to FIG. 9.

Figure 4:
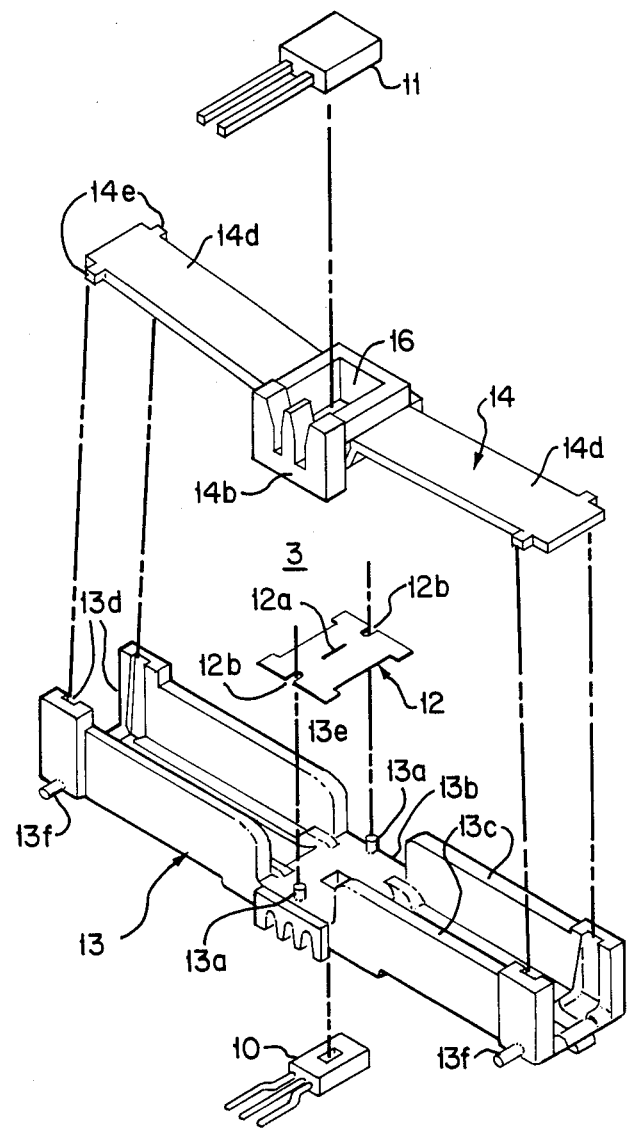
FIG. 4 is an exploded isometric view of the encoder body, without the encoder scale, showing the 5 essential parts of the encoder body.

FIG. 4 is an exploded view of the 5 parts of the encoder unit 3. A detector such as a photo sensor 10 produces an electrical logic signal (FIG. 1, on or off) indicating high or low light intensity. The source of light or emitter is an infrared light emitting diode 11. An aperture plate 12 provides a narrow slit 12a to control transmission from the source of light 11 to the detector 10 in such a way that the narrow opaque lines can block transmission between the much wider light emitting and light detecting areas of the source 11 and detector 10 to provide precise resolution of the scale divisions. An emitter holder 13 and a detector holder 14 serve several purposes. These are, positioning of the emitter 11, detector 10, and the aperture plate 12, control of the strip position (up or down, as viewed) relative to these parts and mounting of the assembly to a printed circuit board. The following description of the assembly of the encoder unit 3 illustrates how these functions are realized.

Figure 5A:
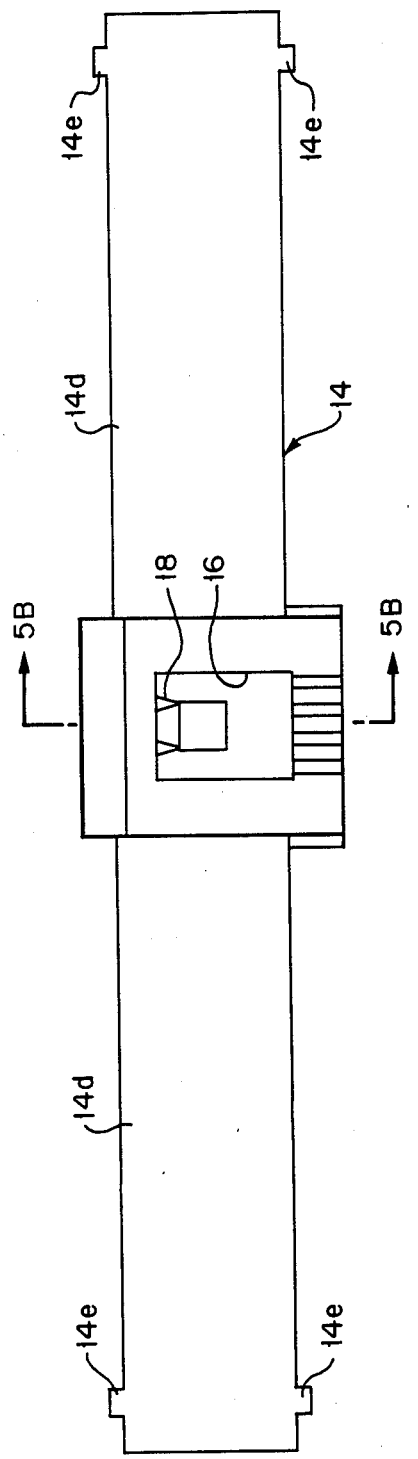
FIG. 5a is a top plan view of the emitter holder of the encoder body, of the single channel encoder.
Figure 5B:
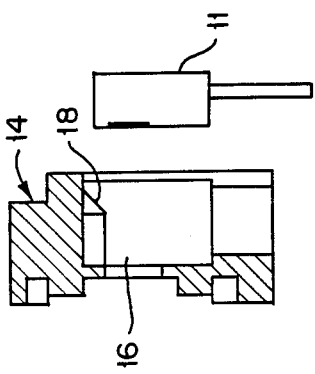
FIG. 5b is an enlarged cross-sectional view of the emitter holder taken on the line Vb—Vb of FIG. 5a with the emitter in position for insertion into the cavity of the emitter holder.

Assembly begins with mounting of the detector 10 and the emitter 11 in the cavities of their respective holders 13 and 14. In both cases an interference fit serves to locate the detector 10 and emitter 11 during insertion and to hold them in place after seating. The parts are fastened into respective cavities 15 and 16, as seen in FIGS. 5a,b and 6a,b. These cavities are in the respective holders. Triangular blade structures 17 and 18, respectively, are where the interference occurs, thereby allowing the use of the opposite wall as a position reference. The blades also serve to limit the insertion force required by minimizing the amount of deformed material over the tolerance ranges of the parts involved. In this way the optoelectronic parts are accurately positioned and secured. Additionally they are easy to insert.

Positioning of the aperture plate 12 on the detector holder 13 is the next assembly step. As seen in FIG. 4, a pair of slots, 12b, are provided on the opposite edges of the aperture plate 12. These slots, 12b, fit over and around a pair of pins 13a on the detector holder 13 (FIGS. 4, 6a and 11b). The aperture plate 12 is symmetrical. This symmetry of the aperture plate allows it to be positioned in any of the four possible orientations on the detector holder 13 about the pins 13a. The aperture plate 12 is clamped in place between the emitter holder 14 and the detector holder 13 in the next assembly step as seen in FIGS. 7, 8a, 8b, and 8c which detail the parts and show the final assembly.

As noted, this next assembly step completes the encoder unit assembly. In this step the emitter holder 14, FIGS. 7 and 8, is pressed into the channel between the sides 13c, FIGS. 4 and 11b, of the detector holder 13. Lateral projections 14e on each side of the ends of the arms 14d of the emitter holder fit into slots 13d in the sides of the detector holder 13 adjacent its ends where the projections 14e are secured beneath shoulders in the upper ends of the slots. FIG. 7 shows the bottom face of the emitter holder 14 which engages with the detector holder 13. A pair of slots 14a similar to those slots 12b in opposite ends of the aperture plate 12, open through the bottom face 14c of the sides 14b of the emitter holder 14 at its center. These slots fit over the same pair of pins 13a on the detector holder 13 and accurately position the emitter holder 14 with respect to the detector holder 13. The clamping surfaces 14c at the bottom of the sides 14b bear against the aperture plate 12 and hold it flat against the detector holder 13, in a precise position between the detector 10 and the emitter 11. As seen in FIGS. 8a, b and c, once the emitter holder 14 is in place the two extension arms 14d are pushed into the channel 13b defined between the sides 13c of the detector 13. In greater detail these arms are each provided with laterally projecting lugs 14e which engage and snap into the slots 13d and the sides 13c of the detector holder 13 where they are held in this deflected position beneath the shoulders at the upper ends of the slots, securing the assembly. Their bending stiffness produces the clamping force which locks the aperture plate in position and secures the two holders 13 and 14 together to complete the encoder body 3.

Thus far the description of the encoder unit assembly has illustrated how the detector 10, emitter 11, and aperture plate 12 are positioned and held in their respective positions, and the way in which the emitter and detector are secured by interference fitting in their cavities. A second function of the holders 13 and 14 is the precise control of the gap between the encoder scale 2 and the aperture plate 12. The gap size is functionally critical in optically resolving the scale. It is sensitive to disturbance in the form of scale displacement, or vibration, vertically, as seen in FIG. 10. The control of scale movement or displacement along the optical axis is an important feature of this invention. The optical system is schematically depicted in FIG. 9 which is not to scale. FIG. 9 illustrates how the encoder operates and why control of the gap dimension G is so important. Features in the holders 13 and 14 which control the gap dimension G are shown in FIG. 10.

FIG. 9, while not to scale, is developed to clearly present the functional relationship of the encoder parts. Only the essential parts of the holders themselves are shown in the interest of simplicity. The paths of light 11b from the emitter lens 11a to the encoder scale 2 are shown as well as shadows 11c cast by the opaque bands or lines 2a of the encoder scale onto the aperture plate 12. As relative movement between the encoder scale 2 and the encoder unit 3 takes place, these shadows sweep past the slit 12a in the aperture plate 12 causing the detector 10 to turn on and off. Note that because the lens 11a of the emitter 11 is wider than the opaque lines on the encoder scale the shadows 11c become more narrow in moving from the encoder scale 2 to the aperture plate 12. Herein lies the importance of the gap dimension G between the encoder scale 2 and the aperture plate 12. As the encoder scale 2 moves away from the aperture plate 12 (upwardly, as viewed), the shadows become more narrow. Once their width becomes less than that of the aperture slit 12a, light is transmitted to the detector 10, even in the situation when an opaque line is centered over the aperture slit 12a. In this event, light energy impinges on the detector 10 causing it to remain in the on state and the encoder ceases to function in resolving the scale divisions. Therefore controlling the gap size is functionally critical.

Mechanical features on the detector and emitter holders 13 and 14, respectively, serve to determine and maintain the gap between the encoder scale and the aperture plate 12. FIG. 10 shows the encoder parts, 2, 10, 11, and 12, of FIG. 9 mounted in the detector and emitter holders 13 and 14. The two curved projections 13e on the detector holder 13 function as scale supports or guides and are equally longitudinally spaced on opposite sides of the aperture plate 12. The projection 14f on the emitter holder 14 is centered between the two projections 13e. These opposing scale supports form a narrow channel therebetween whose spacing is preferably no greater than the thickness of the encoder scale 2 and is preferably equal to, or slightly less than, the encoder scale thickness, thereby fixing the surface of the encoder scale 2 in the optical axis and precisely fixing and maintaining the dimension of the optical gap G.

As seen in FIGS. 11a and 11b the projections 14f are on opposite side of the emitter holder 14 at its center and the pairs of projections or scale supports 13e are on opposite sides of the detector holder in spaced positions on opposite sides of the center of the detector holder. Thus there is no danger of pinching the encoder scale when dimensional tolerances lead to a channel of lesser dimension than that thickness of the encoder scale. As fragmentarily shown in FIG. 11b the projections or scale supports 13e are disposed in positions which are outside of the opaque lines on the encoder scale. The same consideration applys to the projections or scale supports of FIG. 11a. This avoids scratching of the scale pattern in the scale zone that is optically functional.

The final function of the holder assembly is to provide a mechanical interface with a printed circuit board. This interface must hold the encoder to the circuit board until the encoder leads are soldered. The interface must also secure the encoder against movement with respect to the circuit board to protect the leads from stress during normal handling and operation. The interface must be one suitable for robotic assembly. This interface function is provided by two pins 13f on one side at the bottom of the detector holder. These pins are shown in FIG. 11b. The key features are a pair of blades 13g on each pin. These are designed so as to provide an interference fit with the corresponding holes in the circuit board (not shown). During insertion the blades are deformed. When the encoder is properly positioned the blades are pushed through the holes and emerge beneath the circuit board thereby relieving the deformation which occurred during insertion. In this way a sharp detent or drop in insertion force is generated. Such a detent is useful in the context of insertion by flexible automation because it provides a clear signal that the part is in position. In addition the encoder is securely anchored to the circuit board.

This single channel encoder provides three unique design features. The first is a combination of the dark lines on the encoder scale which are wider than the transparent spaces therebetween and which are used in defining the scale divisions. This scale design plus the control of the gap dimension between the encoder scale and the aperture plate minimizes variations in optical coupling between the emitter and the detector providing a wide functional operation margin of the optoelectronics while maintaining precise resolution of the scale divisions. Second, the design of the holders allows accurate positioning and easy assembly of the emitter, detector, and aperture plate. Third the mounting pins provide a circuit board interface well suited for robotic insertion.

INDUSTRIAL APPLICABILITY

This single channel encoder is applicable in resolving scale divisions in an axis of freedom in printers, plotters, machine tools and the like.

We claim:

1. An encoder, comprising:
   a scale of transparent material having spaced opaque lines, of a length less than the width of said scale, disposed transversely of said scale, defining scale divisions;
   an encoder body having a light emitter, a detector, and an opaque aperture plate disposed therebetween;
   said aperture plate having an aperture disposed in the light path between light emitter and said light detector;
   said scale passing through said light path adjacent said aperture plate;
   scale supports on said encoder body in sliding contact with one face of said scale on opposite sides of said aperture along said scale, and on opposite sides of said scale divisions, which together provide four point sliding contact with said one face of said scale; and
   scale supports on said encoder body in sliding contact with the opposite face of said scale, in positions on opposite sides of said scale divisions and substantially in line with said aperture, providing two point sliding contact with said opposite face of said scale;
   the gap between the points of sliding contact of said scale supports on opposite sides of said scale being preferably no greater than the thickness of said scale and maintaining said scale in a predetermined spaced position with respect to the aperture of said aperture plate in said light path.

2. The invention according to claim 1, wherein said encoder body comprises:
   an elongated emitter holder having a pair of oppositely projecting flexible arms and an emitter cavity therebetween mounting said light emitter;
   an elongated detector holder having a cavity mounting said light detector and being of a length substantially the same as that of said elongated emitter holder;
   side members on said detector holder defining a channel therebetween;
   indexing means on said detector holder positioning and indexing said aperture plate on said detector holder with said aperture spaced from said light detector in said light path;
   clamping means on said emitter holder having a face engaging and clamping said aperture plate on said detector holder; and
   means for engaging and securing said flexible arms of said emitter holder, adjacent their ends, to said detector holder, with said flexible arms in deflected position, completing the assembly of said encoder body and securely clamping said aperture plate against movement.

3. The invention according to claim 2, wherein said clamping means comprises:
   means engaging said indexing means for indexing said clamping means.

4. The invention according to claim 2, wherein:
   said side members each have an opening therein adjacent said aperture plate; and
   said clamping means comprises side members which fit into said openings.

5. The invention according to claim 4, wherein:
   said side members of said clamping means each have slots opening through the bottom faces thereof for receiving said indexing means.

6. The invention according to claim 1, wherein:

the width of said spaced opaque lines is greater than the spaces therebetween.

7. The invention according to claim 1, wherein: the width of said aperture of said aperture plate is less than the space between adjacent opaque lines.

8. The invention according to claim 1, wherein: the length of the aperture in said aperture plate is less than the length of said spaced opaque lines.

* * * * *